UNITED STATES PATENT OFFICE.

JOHANNES SCHIFFMANN, OF NEW YORK, N. Y.

PROCESS OF PRODUCING INDELIBLE ANILINE INK.

SPECIFICATION forming part of Letters Patent No. 428,146, dated May 20, 1890.

Application filed July 1, 1889. Serial No. 316,245. (Specimens.)

*To all whom it may concern:*

Be it known that I, JOHANNES SCHIFFMANN, of New York city, New York, have invented an Improved Process of Producing Indelible Aniline Ink, of which the following is a specification.

This invention relates to a new process by which a freely-flowing violet aniline ink is obtained. This ink is adapted to be used for marking textile fabrics, and while the ink is of a violet color when in the bottle, it will turn into a perfect black by oxidation after having been applied.

In carrying out my process I take about fifty grams of aniline-oil (containing more or less toluidine) and mix it with about twenty cubic centimeters of water and with about twenty-five cubic centimeters of hydrochloric acid. The mixture is placed in a suitable vessel, which is subjected to the action of heat (a steam-jacket kettle being preferably used) until the aniline is entirely dissolved. I then add to the solution about ten grams of chloride of copper and carry the heat to the boiling-point. In the process as thus far carried out the quantity of aniline is, as will be seen, about double the quantity of the acid. Therefore the aniline will not become saturated by the acid, and the mixture will contain free bases. The mixture will gradually assume a violet color, and when at this stage I add about fifteen additional cubic centimeters of hydrochloric acid and about ten grams of bichromate of potash, small quantities of these substances being alternately poured in. The potassium chromate serves as a slow oxidizing agent, inasmuch as the chromic acid is not in a free state. If during the introduction of the bichromate of potash the effervescence becomes too violent, the heat is shut off. Finally, I add about ten to fifteen additional cubic centimeters of hydrochloric acid, which has for its object to bring all violet coloring-matter which may have separated from the liquid into solution. The separation of some of the violet coloring-matter is due to the fact that during the process of the oxidation, as above described, the acid to a certain extent is absorbed, and therefore only one portion of the violet coloring-matter remains in solution, while the other portion is precipitated. The product is now filtered to separate any small particles of solid matter that may have formed. The ink is now complete and ready for use.

The violet coloring-matter which is produced and made use of in this process is the spirit-soluble nigrosine. I have found that this coloring-matter is soluble by the addition of hydrochloric acid in the presence of aniline or toluidine salts. Thus by reason of the fact that during the process of the actual formation of the color the bases are kept in excess of the acids a violet coloring-matter is produced, which is soluble in acidulated water or in the acid added last during the process in the presence of aniline or toluidine salts. This result would not be obtained if the acid used in the process had been added at once. By the use of an excess of base at such actual formation of the color only a part of the aniline and toluidine is directly oxidized, while the remaining portion serves to keep the prepared die in solution and serves the purpose of adding to the color by being converted into insoluble black on the fiber on exposure to the air. The process will thus produce a violet soluble coloring-matter in contradistinction to an insoluble precipitate. After the ink has been applied to the textile fabric the oxidation is completed by the air, and a pure black indelible color is obtained. Of course this color may also be used as a dye.

What I claim is—

The process of producing a soluble violet aniline ink, which consists in causing the slow oxidation of a mixture of aniline-oil and hydrochloric acid by an oxidizing agent while the bases are in excess of the acid, dissolving the violet coloring-matter thus produced by an addition of acid, and filtering the product, substantially as specified.

JOHANNES SCHIFFMANN.

Witnesses:
    F. V. BRIESEN,
    A. JONGHMANS.